US008276082B2

(12) United States Patent
Marsh

(10) Patent No.: US 8,276,082 B2
(45) Date of Patent: Sep. 25, 2012

(54) METHOD AND COMPUTER READABLE MEDIA FOR ORGANIZING DIGITAL STREAM CONTENTS

(75) Inventor: Brian Marsh, Tokyo (JP)

(73) Assignee: Fry-Altec, Inc., Marina Del Rey, CA (US)

( * ) Notice: Subject to any disclaimer, the term of this patent is extended or adjusted under 35 U.S.C. 154(b) by 62 days.

(21) Appl. No.: 12/915,596

(22) Filed: Oct. 29, 2010

(65) Prior Publication Data

US 2011/0047196 A1 Feb. 24, 2011

Related U.S. Application Data

(63) Continuation of application No. 10/472,265, filed as application No. PCT/JP02/05917 on Jun. 13, 2002, now Pat. No. 7,831,916.

(30) Foreign Application Priority Data

Jun. 15, 2001 (JP) .................................. 2001-181661

(51) Int. Cl.
*G06F 3/00* (2006.01)
*G06F 17/00* (2006.01)
*G06F 15/16* (2006.01)
*H04J 3/24* (2006.01)
*H04N 11/02* (2006.01)

(52) U.S. Cl. ........ 715/751; 715/753; 715/203; 709/205; 709/231; 370/473; 370/474; 375/240.01

(58) Field of Classification Search .................. 715/751, 715/753, 203; 709/205, 231; 370/473, 474; 375/240.01
See application file for complete search history.

(56) References Cited

U.S. PATENT DOCUMENTS

| 5,613,032 | A | | 3/1997 | Cruz |
| 5,675,511 | A | * | 10/1997 | Prasad et al. ................... 715/203 |
| 5,737,552 | A | | 4/1998 | Lavallee |
| 5,765,164 | A | | 6/1998 | Prasad |
| 6,108,728 | A | | 8/2000 | Kobayashi |
| 6,195,091 | B1 | | 2/2001 | Harple et al. |
| 6,490,627 | B1 | * | 12/2002 | Kalra et al. ................... 709/231 |
| 7,134,074 | B2 | | 11/2006 | Munetsugu et al. |
| 7,675,939 | B2 | | 3/2010 | Kawamura |
| 7,733,956 | B1 | * | 6/2010 | Kalra et al. ................. 375/240.1 |
| 2001/0052019 | A1 | | 12/2001 | Walters et al. |
| 2005/0210393 | A1 | | 9/2005 | Maeng |

FOREIGN PATENT DOCUMENTS

| JP | 2000-175139 | 6/2000 |
| WO | WO 9608107 | 3/1996 |
| WO | WO 9741504 | 11/1997 |
| WO | WO 9921364 | 4/1999 |
| WO | WO 0028731 | 5/2000 |
| WO | WO 0054223 | 9/2000 |

OTHER PUBLICATIONS

European Patent Office, International Search Report for International Application No. PCT/JP02/05917, Mail Date Aug. 23, 2002.

(Continued)

*Primary Examiner* — Hoang-Vu A Nguyen-Ba
(74) *Attorney, Agent, or Firm* — SoCal IP Law Group LLP; Steven C. Sereboff; John E. Gunther

(57) ABSTRACT

A method and computer readable storage media for organizing digital stream contents. A plurality of time-sequential segments of digital stream data may be stored in a corresponding plurality of stream data files. Identifying information for each of the stream data files may be stored in order of recording in an administrative file.

22 Claims, 8 Drawing Sheets

OTHER PUBLICATIONS

State Intellectual Property Office of P.R.C., Notification of First Office Action for Chinese Application No. 02810701.2, Mail Date Feb. 18, 2005.

Japanese Patent Office, Notification of Final Rejection for Japanese Application No. 2001-181661, Mail Date Nov. 2, 2004.

Japanese Patent Office, Notification of Reasons for Rejection for Japanese Application No. 2001-181661, Mail Date Apr. 6, 2004.

Australian Patent Office, Written Opinion for Australian Application No. 200305388-1, Mail Date Jan. 20, 2004.

* cited by examiner

```
Jimmy Joe Bob
Tony Kranducci
Joey Tranducci
Maucus Rodgers
Eric Feigenbaum
Masa Yamagiwa
Jimmy Joe Bob
```

FIG. 4

```
Jimmy Joe Bob, Slide_A, Slide_G
Tony Kranducci, Slide_B
Joey Tranducci, Slide_C
Maucus Rodgers, Slide_D
Eric Feigenbaum, Slide_E
Masa Yamagiwa, Slide_F
```

FIG. 5

```xml
<?xml version="1.0"?>
<session>
    <settings>
        <type>noevents</type>
        <format>RealMedia</format>
        <recdate>5_17_2001</recdate>
    </settings>
    <event>
        <filename>conf_1</filename>
        <timecode>00:00:10</timecode>
        <speaker>Jimmy Joe Bob</speaker>
        <slidetitle>Slide_A</slidetitle>
    </event>
    <event>
        <filename>conf_2</filename>
        <timecode>00:01:25</timecode>
        <speaker>Tony Kranducci</speaker>
        <slidetitle>Slide_B</slidetitle>
    </event>
    <event>
        <filename>conf_3</filename>
        <timecode>00:04:03</timecode>
        <speaker>Joey Tranducci</speaker>
        <slidetitle>Slide_C</slidetitle>
    </event>
    <event>
        <filename>conf_4</filename>
        <timecode>00:06:52</timecode>
        <speaker>Maucus Rodgers</speaker>
        <slidetitle>Slide_D</slidetitle>
    </event>
    <event>
        <filename>conf_5</filename>
        <timecode>00:09:15</timecode>
        <speaker>Eric Feigenbaum</speaker>
        <slidetitle>Slide_E</slidetitle>
    </event>
    <event>
        <filename>conf_6</filename>
        <timecode>00:10:59</timecode>
        <speaker>Masa Yamagiwa</speaker>
        <slidetitle>Slide_F</slidetitle>
    </event>
    <event>
        <filename>conf_7</filename>
        <timecode>00:12:20</timecode>
        <speaker> Jimmy Joe Bob</speaker>
        <slidetitle>Slide_G</slidetitle>
    </event>
</session>
```

FIG. 6

METHOD AND COMPUTER READABLE MEDIA FOR ORGANIZING DIGITAL STREAM CONTENTS

RELATED APPLICATION INFORMATION

This patent is a continuation of application Ser. No. 10/472,265, filed Sep. 16, 2003, now U.S. Pat. No. 7,831,916, entitled METHOD, SYSTEM, AND PROGRAM FOR CREATING, RECORDING, AND DISTRIBUTING DIGITAL STREAM CONTENTS, which is a National Stage of PCT Application PCT/JP02/05917, filed Jun. 13, 2002, which claims priority to Japanese Application No. 2001-181661, filed Jun. 15, 2001, which are incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates, to a method, a system or a computer program for creating digital stream contents such as a moving image data or an audio data from a stream signal such as a video signal or an audio signal, and also relates to a storage medium recording such program. The present invention also relates to a method for distributing the digital stream contents created by the above method.

2. Description of the Related Art

With the recent trend of broadband in connecting to the Internet, it is becoming common to distribute various moving image data via the Internet, and for example, there exists a web site distributing a video image captured from scenes of such as a briefing of account settlement. As a data format of moving images distributed via the Internet, for example, formats such as RealVideo®Windows Media® are generally used. When creating such moving image data conventionally, first a briefing of account settlement or the like to be captured is recorded on video, and from such captured signals moving image files of a desired portion is created by an editing software corresponding to the format of the moving image data to be created, then editing is performed by appropriately rearranging the order of these files.

In such a case, with conventional editing software, every time the respective moving image files are created, setting of various conditions such as bandwidth, image quality, and speech quality, and inputting of file names are required. Therefore, in such a case that editing is to be conducted by dividing the inputted video signals into multiple moving image files, an extremely large amount of time will be required for the editing operation. For such a reason, an extensive amount of time will be required from when an image is recorded until a moving image is distributed, and thus a prompt moving image distribution cannot be accomplished.

DESCRIPTION OF THE DRAWINGS

FIG. 3 is a diagram showing the relation of a scene of a moving image, an operation timing of each button, and a file name of a moving image file generated according to the operation timing, and the like.

FIG. 4 is a diagram showing an example of a speaker order setting file.

FIG. 5 is a diagram showing an example of a slide specifying file.

FIG. 6 is a diagram of an example of an administration file.

DETAILED DESCRIPTION

Figure 1:
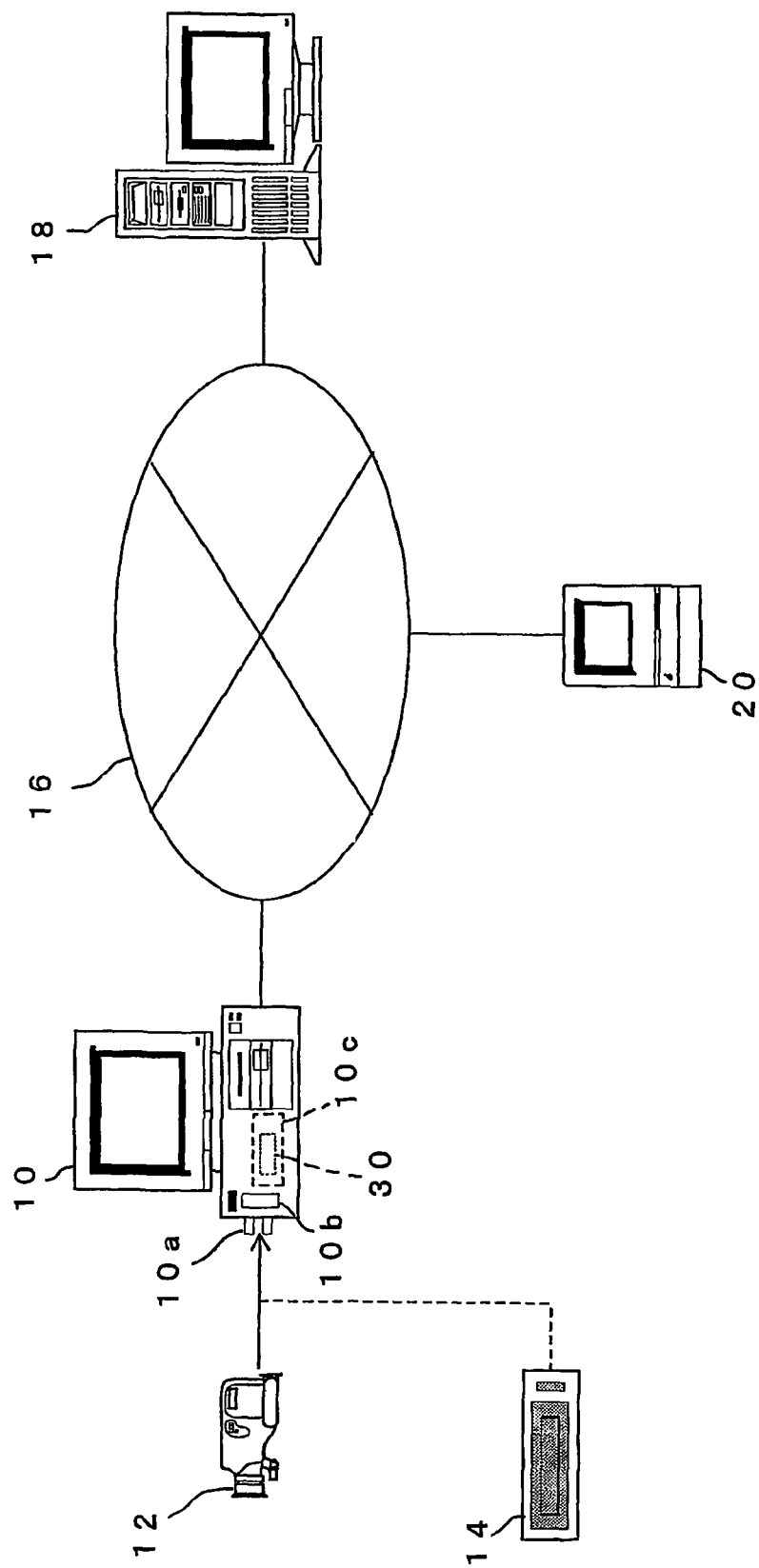
FIG. 1 is an entire structural diagram of an embodiment of the present invention.

FIG. 1 is a structural diagram of an entire system according to an embodiment of the present invention. As shown in FIG. 1, the system of this embodiment comprises a processing computer 10. The processing computer 10 is provided with an input terminal 10a of an audio/video signal (hereinbelow, referred to as "AV signal"), and this input terminal 10a is inputted with an AV signal from a video camera 12 or a video tape recorder (VTR) 14. The processing computer 10 comprises an encoder 10b for converting the AV signal to data in a predetermined moving image format (for example, Windows Media® format RealVideo®), and may convert the AV signal inputted to the input terminal 10a into a moving image data in real time by the encoder 10b.

The processing computer 10 is connected to the Internet 16, and as described below, may upload such as a moving image file to a moving image distribution server 18 in the Internet 16. The moving image distribution server 18 distributes moving images based on such as moving image files uploaded from the processing computer 10, to a user computer 20 which is accessing to the server 18 via the Internet 16.

A storage device of the processing computer 10, such as a hard disk drive 10c, is installed with a moving image editing program 30. The moving image editing program 30 is installed from a storage medium, for example, a floppy disk, a CD-ROM, a DVD-ROM, or the like, to the hard disk drive 10c. However, a moving image editing program 30 may be downloaded to the processing computer 10 via a network and installed to the hard disk drive 10c. By running the moving image editing program 30 in the processing computer 10, moving image files can be edited and created, as described below. Note that, in this embodiment, an example in a case a moving image file is generated from AV signals containing moving images captured from the scene of a conference is described.

Figure 2:
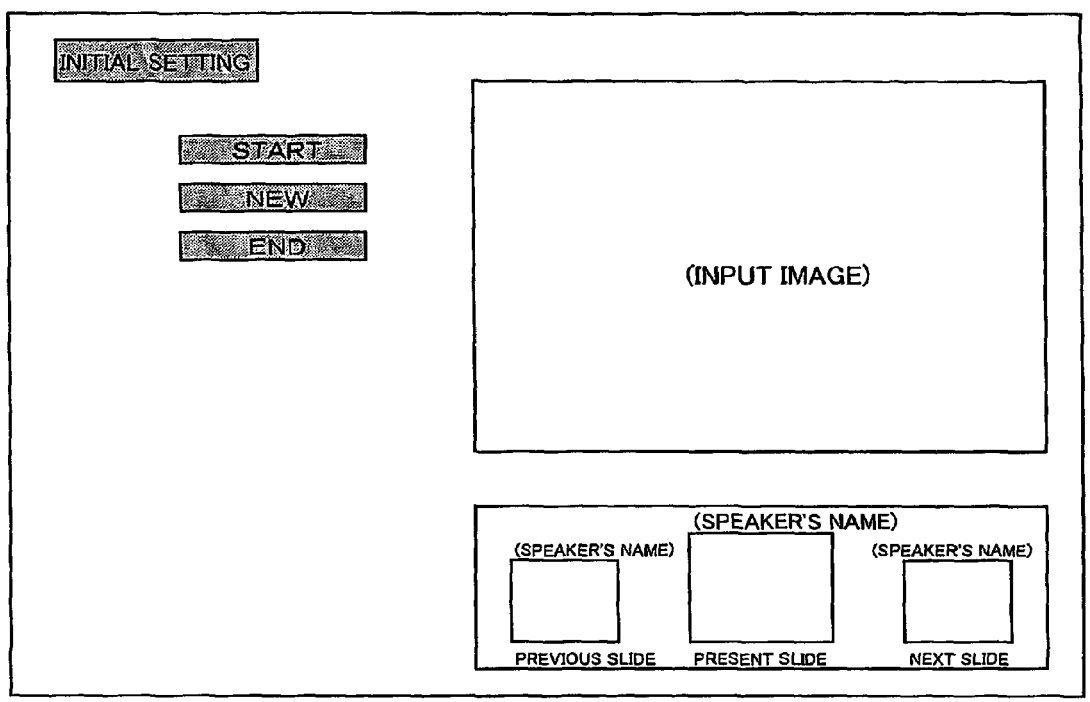
FIG. 2 is a diagram showing an editing screen which is displayed by starting a moving image editing program.

When the moving image editing program 30 is started in the processing computer 10, an editing screen as shown in FIG. 2 is displayed. As shown in FIG. 2, the editing screen includes such as an image display region for displaying the AV signal inputted to the input terminal 10a in real time, slide display regions for displaying slide pictures corresponding to the respective scenes of an image, an "initial setting" menu button, and the respective operation buttons of "START", "NEW", and "END".

When the "initial setting" menu button is clicked, an initial setting screen for conducting various initial settings is displayed. On this initial setting screen, various settings may be conducted, such as setting of encoding conditions such as bandwidth, image quality, and speech quality, setting of a base file name (a file name to be the base when automatically generating a file name of a generated moving image file), creating and editing of a speaker order setting file registering the names of speakers who appear in the image in order of their appearance, creating and editing of slide specifying files registering slides to be displayed corresponding to each speaker, and setting of automatic uploading option (an option of whether or not a moving image file is automatically uploaded to the moving image distribution server 18 when creation of a moving image file is completed). Note that, the user may, for example, obtain in advance a plan of an agenda of a conference, and based on this plan of the agenda of the conference may create a speaker order setting file and a slide specifying file. Further, a predetermined directory within the hard disk drive 10c stores a slide data file (slide picture file) of each slide file name registered in the slide specifying file.

In the above editing screen, when the "START" button is clicked, the encoded moving image data starts to be recorded to a moving image file by the encoder 10b. Further, when the "NEW" button is clicked, the moving image file currently recording data is closed, and moving image data from then on is recorded in a moving image file with a new file name. Note that, the moving image file name is automatically generated, for example, in a format of a combination of a base file name set in the above initial setting and a continuous number. Further, a time code at a point in time the "NEW" button is clicked is obtained from an encoded moving image data.

When the "END" button is clicked, the moving image file which is being created at this point in time is closed. Further, a speaker name and a corresponding slide file name are read successively from the speaker order setting file and the slide specifying file, and these are additionally recorded in an administration file with the corresponding time code and the moving image file name. In a case the automatic uploading option is selected, a generated moving image file, an administration file, and a slide data file are automatically uploaded by a protocol such as FTP to the moving image distribution server 18.

Figure 3:
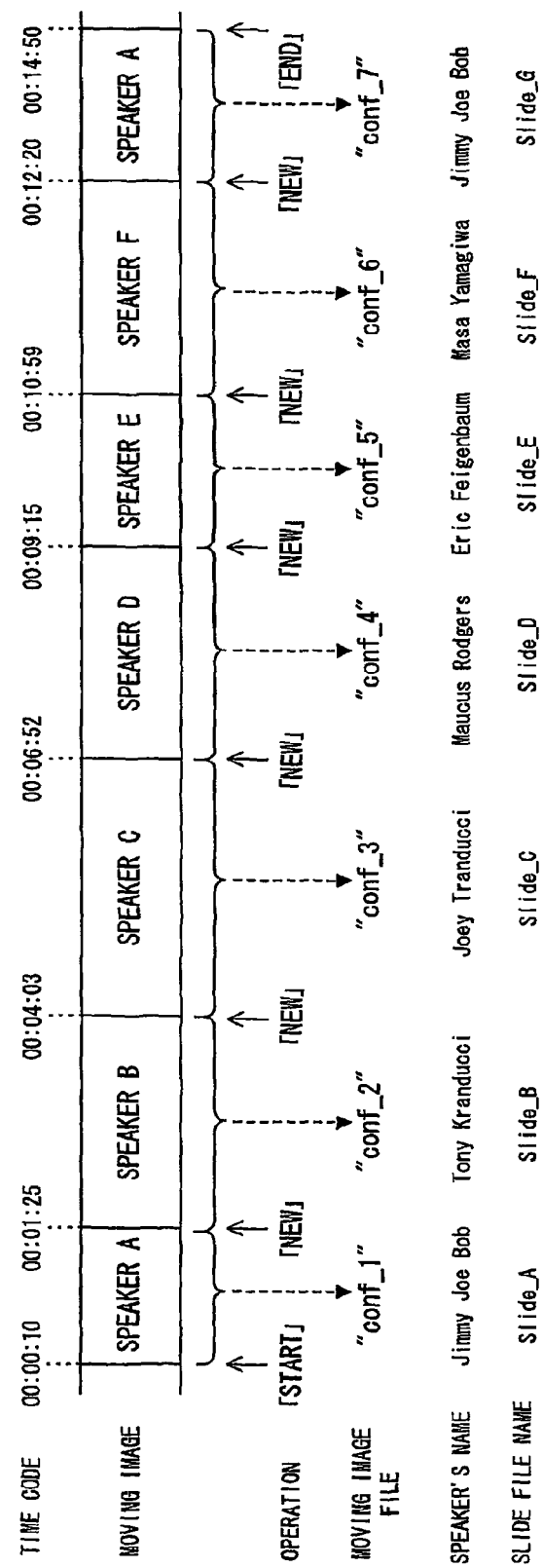

FIG. 3 shows the relationship of a scene of a moving image, an operation timing of each button, and file names of moving image files generated accordingly. Note that, FIG. 3 shows an example in a case a moving image file is generated from an image captured from the scene of a certain conference, and a file of a content shown in FIG. 4 and FIG. 5 are to be generated in advance as the speaker order setting file and the slide specifying file.

In the example shown in FIG. 3, "conf" is specified as a base file name, and when the "START" button is clicked, the first moving image file "conf_1" is created. Thereafter, every time the "NEW" button is clicked at the time of changing speakers, from then on moving image data until a "NEW" button (or the "END" button) is clicked is recorded in new moving image files "conf_2", and "conf_3". Then, after the "END" button is clicked, the speaker name and the slide file name are subsequently read from the speaker setting file and the slide setting file, and they are recorded in the administration file with the moving image file name and the time code.

Note that, recording to the administration file may be conducted every time a new moving image file is generated by clicking the "START" or the "NEW" button.

Further, in the example shown in FIG. 3, two slide files "Slide_A" and "Slide_F" are used in respect to a speaker "Jimmy Joe Bob", and corresponding thereto, in the example of the slide specifying file shown in FIG. 4, these two slide file names are listed in the order of use for the speaker "Jimmy Joe Bob". In this way when a plurality of slide files is used in respect to the same speaker, each slide file name is recorded in order of use corresponding to the speaker. However, the method of writing to the slide specifying file is not limited thereto, and for example, similarly to the speaker order setting file, the slide file name to be used may be recorded in order of use. In short, a data structure is required such that a slide file used in each scene can be specified.

FIG. 6 is a diagram showing the content of the administration file. An example of an administration file generated in the example shown in FIG. 3 is specifically shown. In this embodiment, as shown in FIG. 6, the administration file is written in XML (extensible Markup Language), and is structured, with a <session> element surrounded by a tag <session>-</session> as a route element, comprising one <setting> element surrounded by tag <setting>-</setting>; and a plurality of <event> elements surrounded by tag <event>-</event>. The <setting> element is an element describing such as a data format and a date of creating a moving image file. Further, each <event> element is an element corresponding to each scene separated by clicking the "START" or the "NEW" button, and is respectively structured by such as a <filename> element describing a moving image file name, a <timecode> element showing a time code of a scene starting time, a <speaker> element showing speakers appearing in the image of the corresponding moving image file, and a <slidetitle> element describing the file name of a slide to be displayed in each scene.

Figure 7:
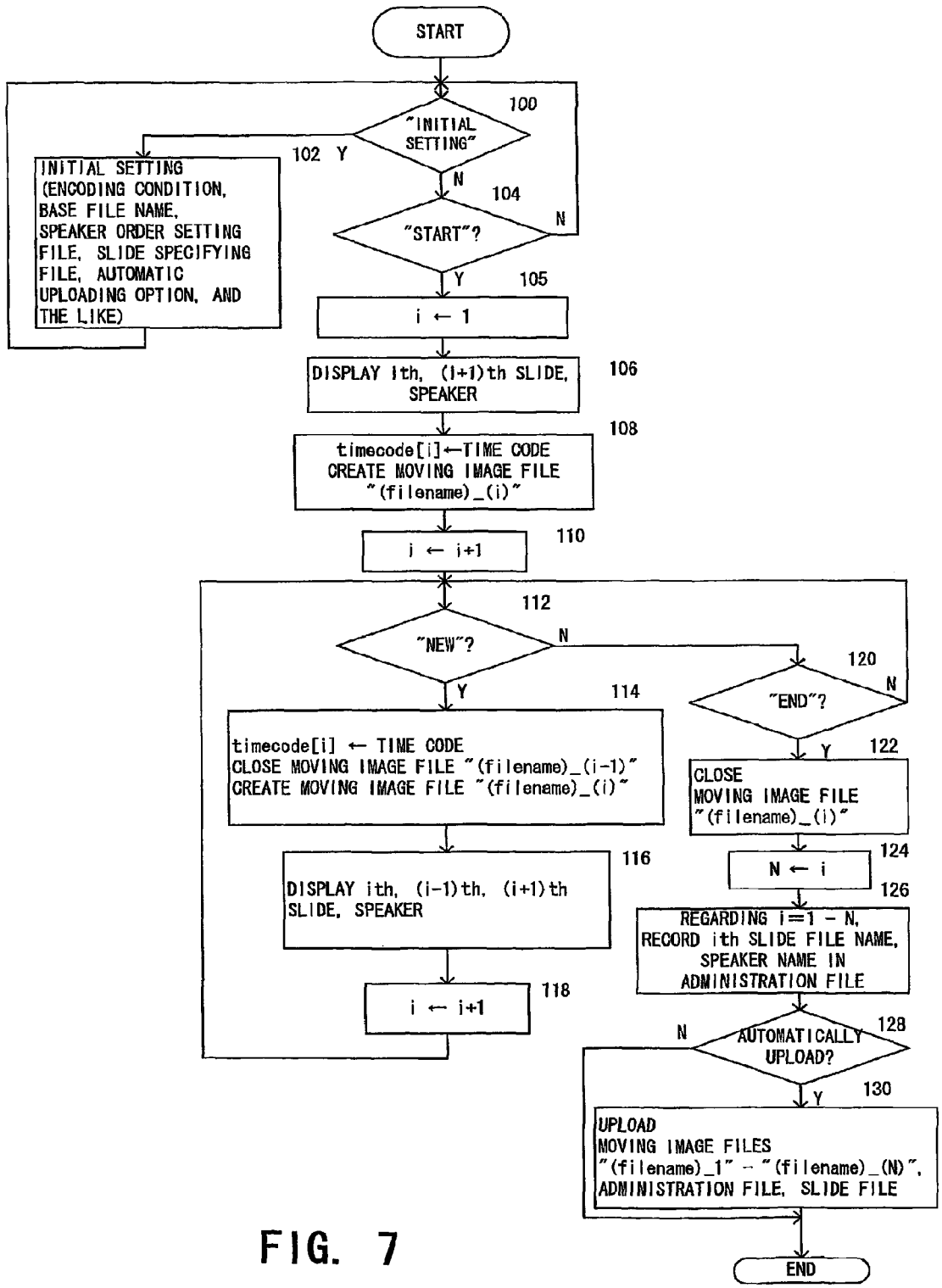
FIG. 7 is a flowchart showing a flow of a process of the moving image editing program.

FIG. 7 is a flowchart showing the flow of the process of the moving image editing program 30 described above. As shown in FIG. 7, when the "INITIAL SETTING" menu button is clicked first (S100), the initial setting screen is displayed, thus initial setting of such as an encoding condition, a base file name, a speaker order setting file, a slide specifying file, and an automatic uploading option is performed (S102). On the other hand, when the "START" button is clicked (S104), a counter variable i is first initialized to 1 (S105). Next, the speaker order setting file and the slide specifying file are referred to, and the ith (first) and the (i+1)th (second) speaker names and corresponding speaker file names are obtained, and the slide data of the obtained slide file names and the speaker names are displayed in the slide display region (S106). Further, a time code at the present time is obtained and stored in the variable "timecode [i]," and a new moving image file (file name: "(base file name)_(i)" is generated, and from then on the encoded moving image data is recorded in this moving image file (S108). Then, the value of the counter i is increased by just 1 (S110).

After the creating of the moving image data file is started as described above, and the "NEW" button is clicked (S112), the time code at that point in time is obtained and stored in the variable "timecode [i]," and further, the moving image file currently recording data (file name: "(base file name)_(i−1)") is closed, and a new moving image file (file name: "(base file name)_(i)") is generated. From then on, this moving image file records moving image data which is encoded after the "NEW" button is clicked (S114).

Next, the speaker order setting file and the slide specifying file are referred to and the ith, (i−1)th, and (i+1)th speaker names and the corresponding slide file names are obtained, and the slide data of the obtained slide file name is displayed with the speaker name in the slide display region (S116). Then, the value of i is increased by just 1 (S118), and the "NEW" button (or the "END" button) waits to be clicked again.

On the other hand, when the "END" button is clicked (S120), a file of the moving image file currently recording data (file name: "(base file name)_(i)") is closed (S122). Then, the present value of i (namely, the number of created moving image files) is stored as a variable N (S124), and in respect to i=1-N, a time code timecode[i], the ith speaker name, and the ith slide file name are recorded in the administration file (S126). Then, when the automatic uploading option is selected (S128), the created N moving image files (file name: "(base file name)_1"-"(base file name)_(N)"), the administration file, and the slide data file are uploaded to the moving image distribution server 18 by FTP or the like (S130).

Next, the process at the moving image distribution server 18 to which the respective moving image files and the administration file created as above are uploaded, is explained.

The moving image distribution server 18 prepares a web page screen data for distributing moving image files uploaded from the processing computer 10. This web page screen data includes such as a moving image distributing program for distributing moving images (or a link to the moving image distribution program) and an order for starting a program for moving image playback in the user computer 20 which is accessing thereto.

The moving image distribution program is described by, for example, a program in the JavaScript® programming language and the like, and the program has a function of sending each moving image file to a user computer 20 in a specified order, and in a case a slide file name is specified corresponding to each moving image file name in the administration file, sending the corresponding slide file to the user computer 20 in synchronization with sending the moving image file. For example, in a case the content of the administration file is as shown in FIG. 6, and moving images regarding the third speaker "Joey Tranducci" is not to be distributed, the distributing order should be specified as "1, 2, 4, 5, 6, 7." Then the moving image file is sent to the user computer 20 in the order of "conf_1", "conf_2", "conf_4" "conf_5", "conf_6", "conf_7", and slide files are sent in the order of "Slide_A", "Slide_B", "Slide_D", "Slide_E", "Slide_F", "Slide_G", in synchronization with these moving image files.

Note that, specifying for activating the moving image playback program is conducted by for example, an <object> tag in HTML statement, and a playback program corresponding to the format of the moving image to be distinguished (for example, Windows Media™ Player in a case the moving image data is in Windows Media™ format) is specified.

When there is an access from the user computer 20 to a URL of the above moving image distributing web page screen data, this web page screen data is sent to the relevant user computer 20. Thus, in the user computer 20, the moving image playback program is started, the moving image files sent from the moving image distribution server 18 are subsequently played back, and when slide data is sent, such slide picture is displayed in synchronization with the moving image which is played back.

Figure 8:
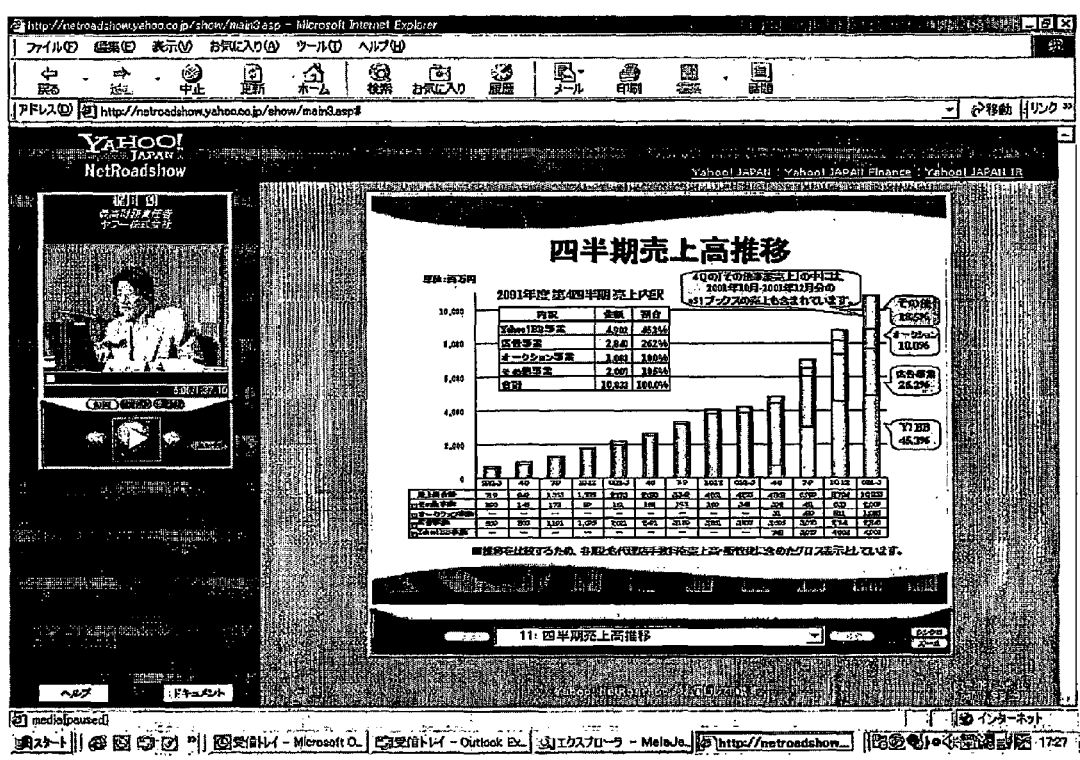
FIG. 8 is an example of a display screen of a user computer receiving moving image distribution.

FIG. 8 is an example of a display screen of the user computer 20 which is receiving moving images distributed as described above FIG. 8 shows an example of distributing the scene of a briefing of a company's account settlement, and displays the moving image of a presenter at the left side of the screen and a slide picture at the right side of the screen, respectively.

As described above, according to the system of this embodiment, an image of an inputted AV signal is monitored, and with a simple operation of clicking the "NEW" button at a separation of a scene (for example, at the time the speakers change), a moving image file corresponding to each screen may be created and an administration file recording a file name of each moving image file can be created. For this reason, in the moving image distribution server 18 which has uploaded the moving image files, just by specifying the distributing order of these moving image files, a moving image data edited to a desired content can be distributed.

Further, the slide file name corresponding to each moving image file is read from the slide specifying file and automatically recorded to the administration file, and the moving image distribution server 18 refers to this administration file and automatically distributes slide data in synchronization with the proceeding of the moving image. For this reason, in the case of such as a presentation using a slide, by just registering the slide file name in the slide specifying file, the moving image and the slide picture can be easily distributed in synchronization with each other.

Note that, in the above embodiment, every time the "NEW" button is clicked, a new moving image file is created and the video image is split to different moving image files for every scene, but the entire video image which is inputted may be stored in a single moving image file, without splitting the moving image file. As described above, the administration file is recorded with a time code at the time each scene is switched, and by referring to the time code included in the moving image data, the moving image data at an arbitrary point in time in the moving image file may be easily accessed. Therefore, by merely recording the time code which is a split in the scenes in the administration file, the moving image data of a desired interval may be extracted based on this time code and sent to the user computer 20.

Further, in the above embodiment, the administration file subsequently records such as the file name of each moving image file which is generated, the corresponding speaker's names and slide file names, or the like, and the moving image distributing program in the moving image distribution server 18 specifies which moving image file is distributed in what order. However, information for specifying the moving image files to be distributed and their order may be recorded in the administration file, and the moving image distributing program may distribute moving images according to this information.

Further, in the above embodiment, assuming that the order of speakers is known in advance, the speaker order setting file and the slide specifying file are created before the moving image file is created, and the administration file is automatically generated at the time of creating the moving image file. However, without being limited to the above, after the moving image file is created, the speaker order setting file and the slide specifying file may be created, and according to their contents, the speaker name and the slide file name may be recorded in the administration file. Alternatively, the user may directly edit the administration file, and input the speaker name and the slide file name.

Further, in the above embodiment, explanation has been made for a case where moving images are distributed as a digital stream contents, and the slide data is distributed in synchronization with the moving images. However, the present invention is not limited to the above, and is applicable to a case of distributing audio signals as a digital stream contents. Further, as an object which is in synchronization with the digital stream contents, other than slides, arbitrary objects may be used such as, stream data such as a different moving image or audio, an animation, or a web page.

Figure 9:
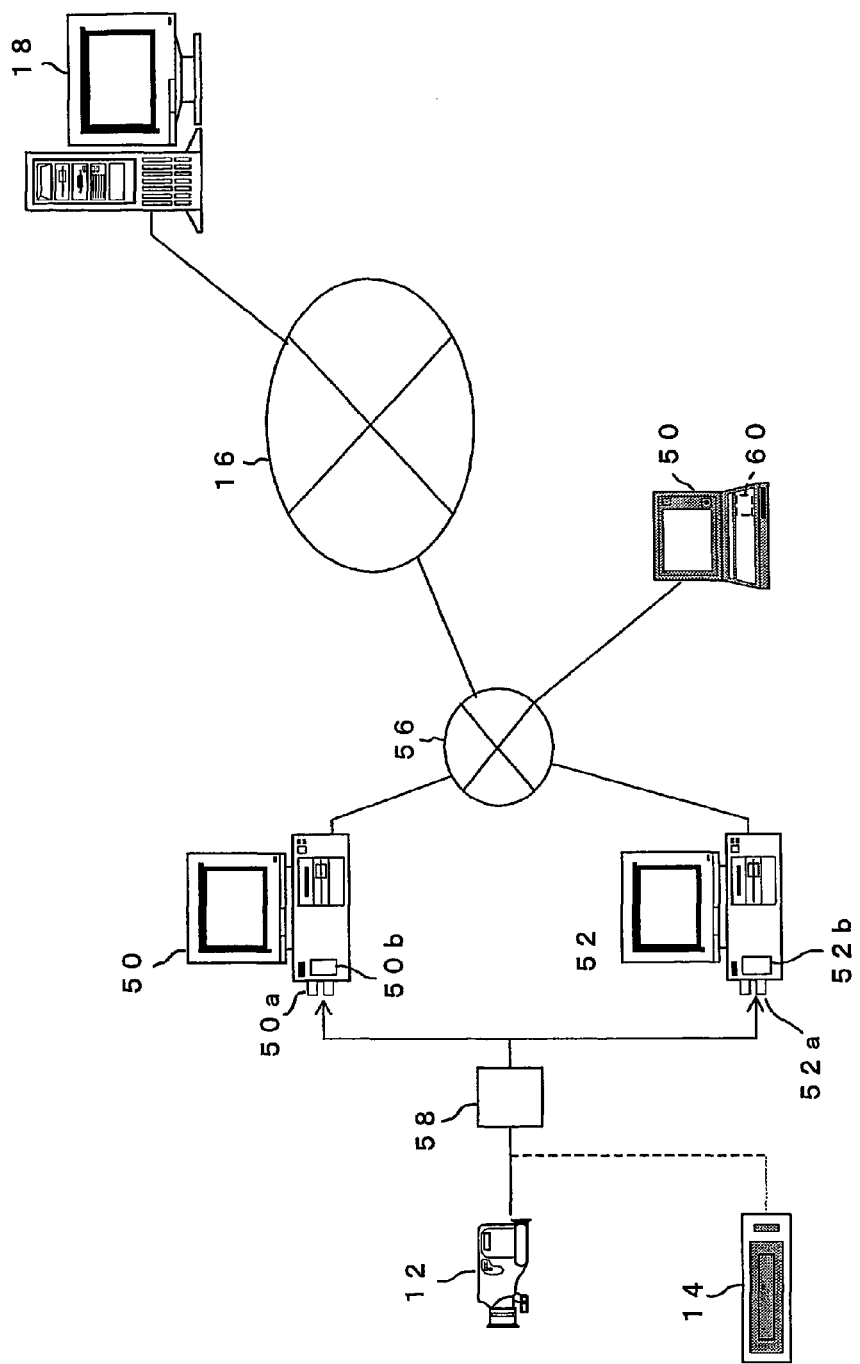
FIG. 9 is an entire structural view of a system according to another embodiment of the present invention.

Next, another embodiment of the present invention is explained. FIG. 9 is a structural diagram of a system of this embodiment. In this embodiment, there are separately provided, encoding computers 50, 52 for encoding the moving image data, an editing computer 54 for editing operations of moving image, and they may communicate with each other via the LAN 56. This LAN 56 is connected to the Internet 16. A video signal from a video camera 12 or a video tape recorder 14 is inputted to A/V input terminals 50a, 52a of the encoding computers 50, 52 via the AV distributor 58. The encoding computers 50, 52 comprise encoders 50b, 52b which conduct encoding in a moving image format different to each other (for example, Windows Media®RealVideo®).

In this embodiment, the editing computer 54 is installed with a moving image editing program 60. When the moving image editing program 60 is started, an editing screen similar to the moving image editing program 30 in the first embodiment is displayed. Then, when the respective operation buttons of "START", "NEW", and "END" included in this screen are clicked, the corresponding processes such as an encoding process, a process of generating the moving image files, a process of generating an administration file, a process of uploading data to the moving image distribution server 18, and the like are not executed in the editing computer 54, but an order to conduct a relevant process is sent to the encoding computers 50, 52 via the LAN 56, and the actual processes are conducted by the encoding computers 50, 52.

In this way by separating the encoding computers 50, 52 and the editing computer 54 and connecting them by the LAN 56, even with a computer which does not have a moving image encoder, it becomes possible to edit a moving image by just connecting to the LAN 56.

Note that, in the example shown in FIG. 9, two encoding computers 50, 52 are provided in order to handle the two kinds of moving image formats, but without limiting to the above, one or three or more encoding computers may be provided corresponding to one or three kinds of moving image formats.

As described above, according to the present invention, a digital stream contents which may conduct distribution in a network may be created by a simple operation.

Further, by recording an identifying information of an object data in relation with each time code and an identifying information of a file, distribution of the object data may be conducted in synchronization with the stream contents.

It is claimed:

1. A method for organizing digital stream contents, comprising:
   storing a plurality of time-sequential segments of digital stream data in a corresponding plurality of stream data files;
   storing identifying information for each of the stream data files in time-sequence order in an administrative file;
   obtaining at least one time code associated with each time-sequential segment of the digital stream data;
   storing the obtained time codes in the administrative file in association with the identifying information for each of the stream data files
   retrieving speaker names associated with at least some of the time-sequential segments from a stored speaker order file; and
   storing the retrieved speaker names in the administrative file in association with the identifying information for each of the stream data files.

2. The method of claim 1, further comprising:
   receiving a stream signal; and
   converting the stream signal into the digital stream data prior to storing the digital stream data.

3. The method of claim 1, further comprising:
   retrieving object indentifying information for one or more object to be shown in synchronization with one or more of the time-sequential segments from a stored object order file; and
   storing the retrieved object identifying information in the administrative file in association with the identifying information for each of the stream data files.

4. The method of claim 1, further comprising:
   after storing identifying information for each of the stream data files in order of recording in the administrative file, sending the plurality of stream data files and the administrative file to a distribution server.

5. A method for organizing digital stream contents, comprising:
   storing a plurality of time-sequential segments of digital stream data in a corresponding plurality of stream data files; and
   storing identifying information for each of the stream data files in time-sequence order in an administrative file,
   wherein the method is performed in accordance with a first user input signifying a start of a first segment of the plurality of time-sequential segments, one or more second user inputs signifying breaks between consecutive segments of the plurality of time-sequential segments, and a third user input signifying an end of a last segment of the plurality of time-sequential segments.

6. The method of claim 5, further comprising:
   upon receipt of the first user input, starting storing the first segment of digital stream data in a first stream data file of the plurality of stream data files;
   upon receipt of each of the one or more second user inputs, closing a stream data file in which a previous segment of the digital stream data was stored and starting storing a new segment of the digital stream data in a new stream data file; and
   upon receipt of the third user input, closing the stream data file in which the last segment of the digital stream data was stored and storing the identifying information for each of the stream data files in order of recording in an administrative file.

7. The method of claim 6, further comprising:
   upon receipt of each of the one or more second user inputs, obtaining a time code from the digital stream data; and
   upon receipt of the third user input, storing the obtained time codes in the administrative file in association with the identifying information for each of the stream data files.

8. The method of claim 7, further comprising:
   upon receipt of the third user input, retrieving speaker names from a stored speaker order file; and
   storing the retrieved speaker names in the administrative file in association with the identifying information for each of the stream data files.

9. The method of claim 7, further comprising:
   upon receipt of the third user input, retrieving object indentifying information for one or more object to be shown in synchronization with one or more stream data files from a stored object order file; and storing the retrieved object identifying information in the administrative file in association with the identifying information for each of the stream data files.

10. The method of claim 5, further comprising:
receiving a stream signal; and
converting the stream signal into the digital stream data prior to storing the digital stream data.

11. The method of claim 5, further comprising:
upon receipt of the third user input, sending the plurality of stream data files and the administrative file to a distribution server.

12. A computer-readable storage device storing a moving image editing program, which, when executed, causes a computing device to perform actions comprising:
storing a plurality of time-sequential segments of digital stream data in a corresponding plurality of stream data files;
storing identifying information for each of the stream data files in time-sequence order in an administrative file;
obtaining at least one time code associated with each time-sequential segment from the digital stream data;
storing the obtained time codes in the administrative file in association with the identifying information for each of the stream data files;
retrieving speaker names associated with at least some of the time-sequential segments from a stored speaker order file; and
storing the retrieved speaker names in the administrative file in association with the identifying information for each of the stream data files.

13. The computer-readable storage device of claim 12, the actions performed further comprising:
receiving a stream signal; and
converting the stream signal into the digital stream data prior to storing the digital stream data.

14. The computer-readable storage device of claim 12, the actions performed further comprising:
retrieving object indentifying information of one or more objects to be shown in synchronization with at least some of the time-sequential segments from a stored object order file; and
storing the retrieved object identifying information in the administrative file in association with the identifying information for each of the stream data files.

15. The computer-readable storage device of claim 12, the actions performed further comprising:
after storing identifying information for each of the stream data files in order of recording in the administrative file, sending the plurality of stream data files and the administrative file to a distribution server.

16. A computer-readable storage device storing a moving image editing program, which, when executed, causes a computing device to perform actions comprising:
storing a plurality of time-sequential segments of digital stream data in a corresponding plurality of stream data files; and
storing identifying information for each of the stream data files in time-sequence order in an administrative file,
wherein the method is performed in accordance with a first user input signifying a start of a first segment of the plurality of time-sequential segments, one or more second user inputs signifying breaks between consecutive segments of the plurality of time-sequential segments, and a third user input signifying an end of a last segment of the plurality of time-sequential segments.

17. The computer-readable storage device of claim 16, the actions performed further comprising:
upon receipt of the first user input, starting storing the first segment of digital stream data in a first stream data file of the plurality of stream data files;
upon receipt of each of the one or more second user inputs, closing a stream data file in which a previous segment of the digital stream data was stored and starting storing a new segment of the digital stream data in a new stream data file; and
upon receipt of the third user input, closing the stream data file in which the last segment of the digital stream data was stored and storing the identifying information for each of the stream data files in order of recording in an administrative file.

18. The computer-readable storage device of claim 16, the actions performed further comprising:
upon receipt of each of the one or more second user inputs, obtaining a time code from the digital stream data; and
upon receipt of the third user input, storing the obtained time codes in the administrative file in association with the identifying information for each of the stream data files.

19. The computer-readable storage device of claim 16, the actions performed further comprising:
upon receipt of the third user input, retrieving speaker names from a stored speaker order file; and
storing the retrieved speaker names in the administrative file in association with the identifying information for each of the stream data files.

20. The computer-readable storage device of claim 16, the actions performed further comprising:
upon receipt of the third user input, retrieving object indentifying information of one or more objects to be shown in synchronization with one or more stream data files from a stored object order file; and
storing the retrieved object identifying information in the administrative file in association with the identifying information for each of the stream data files.

21. The computer-readable storage device of claim 16, the actions performed further comprising:
receiving a stream signal; and
converting the stream signal into the digital stream data prior to storing the digital stream data.

22. The computer-readable storage device of claim 16, the actions performed further comprising:
upon receipt of the third user input, sending the plurality of stream data files and the administrative file to a distribution server.

* * * * *

UNITED STATES PATENT AND TRADEMARK OFFICE
CERTIFICATE OF CORRECTION

PATENT NO.        : 8,276,082 B2
APPLICATION NO.   : 12/915596
DATED             : September 25, 2012
INVENTOR(S)       : Marsh It is certified that error appears in the above-identified patent and that said Letters Patent is hereby corrected as shown below:

Column 8, line 9: replace --indentifying-- with "identifying".

Column 8, line 63: replace --indentifying-- with "identifying".

Column 9, line 38: replace --indentifying-- with "identifying".

Column 10, line 44: replace --indentifying-- with "identifying".

Signed and Sealed this
Thirteenth Day of November, 2012

David J. Kappos
*Director of the United States Patent and Trademark Office*